(12) United States Patent
Willis

(10) Patent No.: US 9,521,920 B2
(45) Date of Patent: Dec. 20, 2016

(54) DEVICE FOR EXTRACTING ZEST FROM A FRUIT, AND RELATED EXTRACTION METHODS

(75) Inventor: Benjamin Stanley Willis, Bellevue, WA (US)

(73) Assignee: LIFETIME BRANDS, INC., Garden City, NY (US)

( * ) Notice: Subject to any disclaimer, the term of this patent is extended or adjusted under 35 U.S.C. 154(b) by 527 days.

(21) Appl. No.: 14/002,664

(22) PCT Filed: Mar. 1, 2012

(86) PCT No.: PCT/US2012/027198
§ 371 (c)(1),
(2), (4) Date: Aug. 30, 2013

(87) PCT Pub. No.: WO2012/118920
PCT Pub. Date: Sep. 7, 2012

(65) Prior Publication Data
US 2013/0334347 A1    Dec. 19, 2013

Related U.S. Application Data

(60) Provisional application No. 61/448,072, filed on Mar. 1, 2011.

(51) Int. Cl.
*A23N 7/00* (2006.01)
*A47J 17/02* (2006.01)
(Continued)

(52) U.S. Cl.
CPC ............... *A47J 17/02* (2013.01); *A23N 7/026* (2013.01); *A23N 7/10* (2013.01); *A47J 17/04* (2013.01); *A47J 17/16* (2013.01)

(58) Field of Classification Search
CPC ............ A47J 17/16; A47J 17/18; A47J 43/25; A47J 43/255; A23N 7/026; A23N 7/10
(Continued)

(56) References Cited

U.S. PATENT DOCUMENTS 4,765,234 A * 8/1988 Cailliot ................. A47J 17/16
99/593
5,558,011 A * 9/1996 Heim .................... A23N 7/026
99/588

(Continued)

OTHER PUBLICATIONS

International Search Report for Application No. PCT/US12/27198 dated Jun. 21, 2012.

*Primary Examiner* — Reginald L Alexander
(74) *Attorney, Agent, or Firm* — Tutunjian & Bitetto, P.C.

(57) ABSTRACT

A device for extracting zest from a fruit includes a body, a carrier coupled to the body, and a blade coupled to the body. The carrier moves the fruit relative to the blade and holds the fruit as the blade separates a portion of the flavedo from the pith of the fruit's peel to extract zest from the fruit. The device also includes an arm that urges the blade against the fruit's peel to generate contact pressure as the carrier moves the fruit relative to the blade, and that allows the blade to move toward and away from the carrier to accommodate the contour of the fruit's peel, which is often curved. The blade includes a plurality of teeth, each configured to cut a portion of the fruit's flavedo from the fruit's pith without separating the pith from the berry. To allow one to extract flavedo in any desired form, such as small and short shavings, or thicker and longer chips, or still longer strings, the blade and carrier are releasably coupled to the body, and the amount of force that the arm exerts on the blade to urge the blade against the fruit's peel is adjustable.

14 Claims, 5 Drawing Sheets

(51) Int. Cl.
  *A47J 17/16* (2006.01)
  *A23N 7/10* (2006.01)
  *A23N 7/02* (2006.01)
  *A47J 17/04* (2006.01)

(58) Field of Classification Search
  USPC .......... 99/588, 593, 594, 595, 596, 598, 541
  See application file for complete search history.

(56) References Cited

U.S. PATENT DOCUMENTS

| | | |
|---|---|---|
| D410,823 S | 6/1999 | Abrams |
| 6,327,071 B1 | 12/2001 | Kimura |
| D465,137 S | 11/2002 | Wong |
| 6,854,383 B2 | 2/2005 | Wang |
| 7,077,058 B2 * | 7/2006 | Muro ................... A47J 17/16 99/541 |
| D577,552 S | 9/2008 | Chalfant et al. |
| D593,819 S | 6/2009 | McGuyer et al. |
| 2002/0185014 A1 | 12/2002 | Ismail et al. |
| 2008/0237378 A1 * | 10/2008 | Harris ................... A47J 43/25 241/93 |
| 2010/0012758 A1 | 1/2010 | Chalfant et al. |
| 2010/0242745 A1 | 9/2010 | Smith et al. |

\* cited by examiner

DEVICE FOR EXTRACTING ZEST FROM A FRUIT, AND RELATED EXTRACTION METHODS

CROSS REFERENCE TO RELATED APPLICATIONS AND CLAIM OF PRIORITY

This application claims priority from commonly owned U.S. Provisional Patent Application 61/448,072 filed 1 Mar. 2011, titled "Zip Zester Systems and Related Methods", which is incorporated by reference.

BACKGROUND

Most fruits include one or more seeds, a berry that surrounds the one or more seeds, and a peel or rind that covers the berry. For example, a lemon and other citrus fruits, such as an orange and a lime, include a plurality of seeds surrounded by juice filled hairs that make-up the berry, and a peel that covers the juice filled hairs or berry. The peel of a citrus fruit includes an outermost layer—the flavedo— and a layer between the flavedo and the berry—the pith. The flavedo is shinny, brightly colored, textured and rich in the fruit's volatile oil, also known as the fruit's zest. The pith is a white, fibrous membrane that helps protect the berry that it surrounds. Because citrus fruits are flavorful, the berry's juice and the flavedo's volatile oil, or zest, are often used to enhance and/or modify a food's flavor.

The volatile oil or zest is particularly popular because it is extremely flavorful, and thus can be used to flavor a food without adding much liquid to the food. Because the pith is fibrous and not that flavorful relative to the zest, most cooks carefully remove a fruit's flavedo from the fruit's pith when extracting the zest from a fruit. Frequently, the process of extracting a fruit's zest from the fruit includes delicately rubbing the fruit's flavedo against a fine grater. Often this is done by grasping the fruit in one hand, holding the grater against a cutting board or the inside of a bowl with the other hand, and then scrapping the flavedo against the grater.

Unfortunately, this process has several drawbacks. It requires careful attention and a deft touch to make sure that none of the fruit's pith is extracted with the flavedo as the fruit's peel is scrapped against the grater. In a busy kitchen, a skilled cook has limited time to carefully extract the fruit's zest using this process. In addition, the process of gathering the zest in this manner is considered one of least desirable jobs in the kitchen. If rushed, a cook might extract some of the pith with the flavedo, which can adversely affect the texture of the food that will receive the zest, or the cook might scrape his knuckles or finger tips against the grater, which can adversely affect the taste and/or hygiene of the food.

SUMMARY

In an aspect of the invention, a device for extracting zest from a fruit includes a body, a carrier coupled to the body, and a blade coupled to the body. The carrier moves the fruit relative to the blade and holds the fruit as the blade separates a portion of the flavedo from the pith of the fruit's peel to extract zest from the fruit. The device also includes an arm that urges the blade against the fruit's peel to generate contact pressure as the carrier moves the fruit relative to the blade, and that allows the blade to move toward and away from the carrier to accommodate the contour of the fruit's peel, which is often curved. The blade includes a plurality of teeth, each configured to cut a portion of the fruit's flavedo from the fruit's pith without separating the pith from the berry. To allow one to extract zest in any desired form, such as small and short shavings, or thicker and longer chips, or still longer strings, the blade and carrier are releasably coupled to the body, and the amount force that the arm exerts on the blade to urge the blade against the fruit's peel is adjustable.

With the device, one can quickly and easily extract zest from a fruit without extracting some of the fruit's pith. Furthermore, with the device, one can quickly and easily extract zest in any desired form by coupling a blade and a carrier that together with the correct contact pressure between the blade and fruit's peel will provide the desired form of the zest. The ability to couple differently configured blades and carriers also allows one to use the device to extract zest from a variety of different fruits, each having a flavedo whose thickness is different than the other fruits.

In another aspect of the invention, a method for extracting zest from a fruit includes: 1) mounting a fruit to a carrier of a device, wherein the carrier is coupled to a body of the device, 2) positioning the carrier relative to a blade of the device such that the blade contacts the peel of the fruit, wherein the blade is coupled to the device's body; 3) moving the fruit's peel relative to the blade while urging the blade against the fruit's peel; and 4) cutting the flavedo of the fruit's peel to separate a portion of the flavedo from the pith of the fruit's peel.

BRIEF DESCRIPTION OF THE FIGURES

FIG. 2A shows the fruit just before the device removes flavedo from the fruit. FIG. 2B shows the fruit while the device removes flavedo from the fruit. And, FIG. 2C shows the fruit after the device has removed much of the fruit's flavedo.

DETAILED DESCRIPTION

Figure 1:
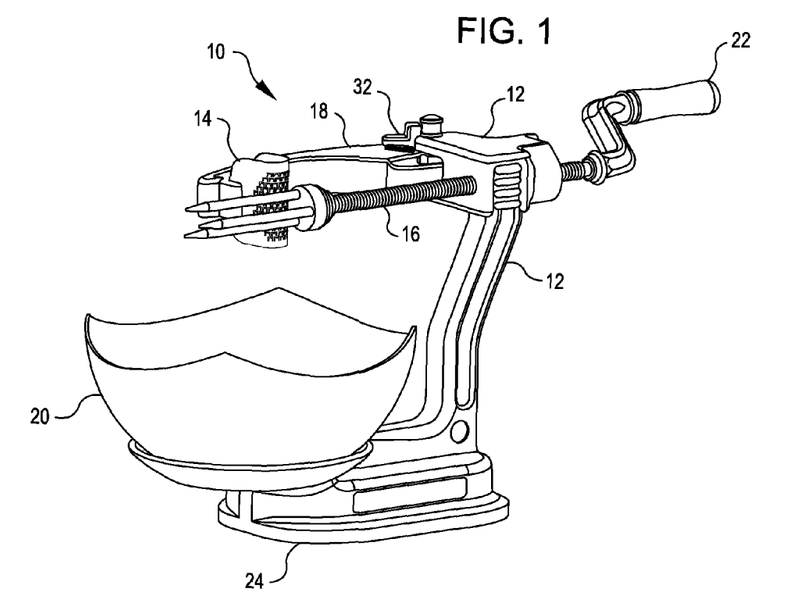
FIG. 1 is a perspective view of a device that one can use to extract zest from a fruit, according to an embodiment of the invention.

FIG. 1 is a perspective view of a device 10 for extracting zest from a fruit, according to an embodiment of the invention. The device 10 includes a body 12, a blade 14 to separate a portion of the flavedo, or zest, from a fruit (not shown in FIG. 1, but shown on FIGS. 2A-2C), and a carrier 16 to hold the fruit while the blade 14 separates the flavedo from the fruit. The blade 14 (discussed in greater detail in conjunction with FIGS. 3-6, 9 and 10) may be configured to extract the flavedo, or zest, from the fruit's peel without extracting the pith from the peel, and may be releasably attached to the body to allow one to attach another, differently configured blade. The carrier 16 (discussed in greater detail in conjunction with FIG. 7) may also be used to move the fruit, and thus the fruit's peel, across the blade 14 while the blade 14 separates the flavedo from the fruit. The device 10 also includes an arm 18 (discussed in greater detail in conjunction with FIG. 8) that urges the blade 14 against the fruit's peel to generate contact pressure as the carrier 16 moves the fruit relative to the blade 14. The arm 18 also allows the blade 14 to move toward and away from the carrier 16 to accommodate the contour of the fruit's peel, which is often curved. The device 10 also includes a bowl 20 to collect the flavedo extracted from the fruit.

With the device 10, one can quickly and easily extract zest from a fruit without extracting some of the fruit's pith. Furthermore, one can quickly and easily extract zest in any desired form, such as small and short shavings, or thicker and longer chips, or still longer strings, by coupling a blade 14 and a carrier 16 that together with the correct contact pressure between the blade 14 and the fruit's peel will provide the desired form of the zest. The ability to couple differently configured blades and carriers also allows one to use the device to extract zest from a variety of different fruits, each having a flavedo whose thickness is different than the other fruits.

Still referring to FIG. 1, the device 10 also includes a handle 22 that one may grab and crank to cause the carrier 16 to move relative to the blade 14, and thus move a fruit held by the carrier 16 relative to the blade 14. In other embodiments of the device 10, a motor (not shown) may be coupled to the carrier 16 to move the carrier 16 relative to the blade 14. The motor may be powered by electricity provided by a conventional power outlet, a battery, or both.

Still referring to FIG. 1, the device 10 also includes a base 24 to stabilize the device 10 during use. The base 24 may have any desired configuration that stabilizes the device 10. For example, in this and other embodiments, the base 24 includes a suction cup (not shown) that can be pressed against the surface of a table or bench to expel air from the cup's cavity and thus generate a partial vacuum in the cup's cavity. With the partial vacuum created, the air pressure in the atmosphere forces the cup against the surface, and thus anchors the device 10 to the surface. With the device 10 anchored, one can crank the handle 22 without the fear that the device 10 might move and cause the bowl 20 to tip spilling the flavedo that has been extracted. In other embodiments of the device 10, the base 24 may include a weight substantially greater than the weight of the remainder of the device 10 to help stabilize the device 10 during use. In still other embodiments, the base 24 may include an adhesive substance that releasably adheres to a variety of different surfaces to allow one to use the device 10 in a variety of different situations.

Figure 2A:
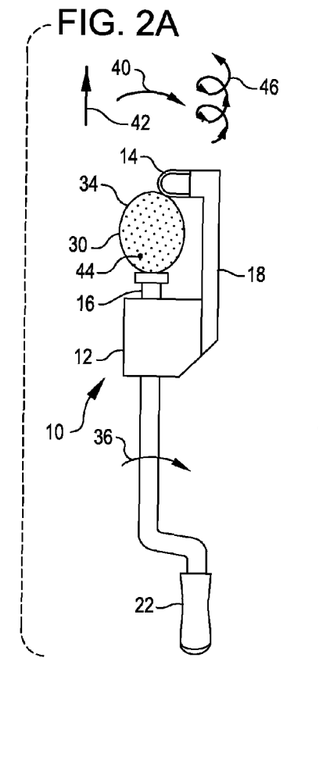
FIGS. 2A, 2B, and 2C are each views of the device shown in FIG. 1, removing flavedo from a fruit, according to an embodiment of the invention.
Figure 2B:
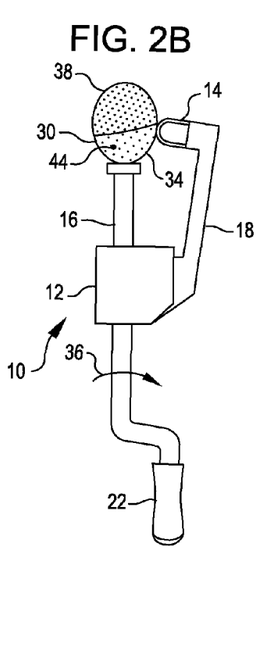
Figure 2C:
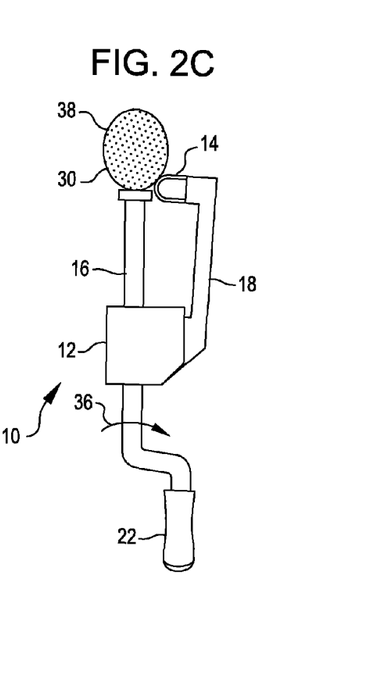

FIGS. 2A, 2B, and 2C are each views of the device 10 shown in FIG. 1, removing flavedo from a fruit 30, according to an embodiment of the invention. FIG. 2A shows the fruit 30 just before the device 10 removes flavedo from the fruit 30. FIG. 2B shows the fruit 30 while the device 10 removes flavedo from the fruit 30. And, FIG. 2C shows the fruit 30 after the device 10 has removed much of the fruit's flavedo. Here, the fruit 30 is an orange, but the device 10 may be used to extract flavedo from other citrus fruits such as a lemon, a lime, a grapefruit, and a Mandarin orange. Furthermore, the device 10 may be used to extract flavedo and pith from citrus fruits. In addition, the device may be used to peel other fruits such as a pear To extract flavedo from the fruit 30, one first mounts the fruit 30 to the carrier 16 and then positions the fruit 30 between the blade 14 and the body 12 of the device 10. In this and other embodiments, one pivots the arm 18 to a position (not shown but typically further away from the carrier than the position of the arm shown in FIG. 2B) to allow one to mount the fruit 30 to the carrier 16 without interference from the blade 14. To keep the arm 18, and thus the blade 14, out of the way while mounting the fruit 30, the arm 18 may be locked at this position using any desired means. For example, as shown in FIG. 1, a jamb 32 may be used to hold the blade away from the carrier 16. Then, one pushes the fruit 30 against the three prongs of the carrier 16 to insert the prongs into the fruit 30. After the fruit 30 is mounted to the carrier 16, one then positions the fruit 30 next to the body 12, releases the jamb and allows the arm 18 to return back toward the carrier 16 (as shown in FIG. 2A).

Next, one cranks the handle 22 in the direction shown by the arrow 36 to cause the carrier 16, and thus the fruit 30, to move relative to the blade 14. As the fruit 30 moves past the blade 14, the arm 18 urges the blade 14 against the fruit 30, and the blade 14 extracts flavedo from the fruit's peel while leaving the pith 38 on the fruit 30. The contact pressure generated by the arm 18 may be adjusted (as discussed in greater detail in conjunction with FIG. 8) as desired to allow the blade 14 to extract the flavedo from a variety of fruits each having a flavedo that is tougher or softer than the other fruits, or to extract the flavedo from many of the same fruit, each having a flavedo that is tougher or softer than the others based on their respective ripeness and freshness. For example, in this and other embodiments, the contact pressure ranges from about 2.2 to about 4.0 lbs and provides good extraction of a fresh, ripe orange's flavedo. If the flavedo is tougher because of the specie of the fruit, such as a pomelo, or because the orange 30 is stale and not ripe, then the contact pressure may be increased to allow the blade to extract the flavedo.

The movement of the fruit 30 relative to the blade 14 may include any desired rotation, any desired translation, or any desired combination of the two. For example, in this and other embodiments, the movement may include twelve complete rotations in the direction shown by the arrow 40 for every inch of translation in the direction shown by the arrow 42. Such a combination causes a point 44 on the fruit's peel 34 to define a helical path 46. As this point 44, and every other point on the fruit's peel, that combined, define the surface of the fruit's peel, contacts the blade 14, each of the points travels diagonally across the blade 14. This specific diagonal direction across the blade 14 combined with the arrangement of the blade's teeth and the configuration of each of the blade's teeth (discussed in greater in detail in conjunction with FIGS. 3-6) determines the form of the flavedo extracted from the fruit 30. If the length of the translation 42 for each complete rotation 40 equals the width of the cutting edge of each of the blade's teeth that are contacting the flavedo, then the flavedo is extracted as a long string. If the length of the translation 42 is longer or shorter than the width of the cutting edge, then the flavedo is extracted as small and short shavings. Because the length of the translation 42 for each complete rotation 40 is determined by the pitch of the carrier 16 (discussed in greater detail in conjunction with FIG. 7), changing the pitch of the carrier 16 can change the form of the flavedo extracted by the blade 14.

Other embodiments are possible. For example, although the fruit 30 is shown moving away from the body 12 while flavedo is extracted from the fruit's peel, the fruit 30 may be moved toward the body 12 while flavedo is extracted from the fruit's peel.

Figure 3:
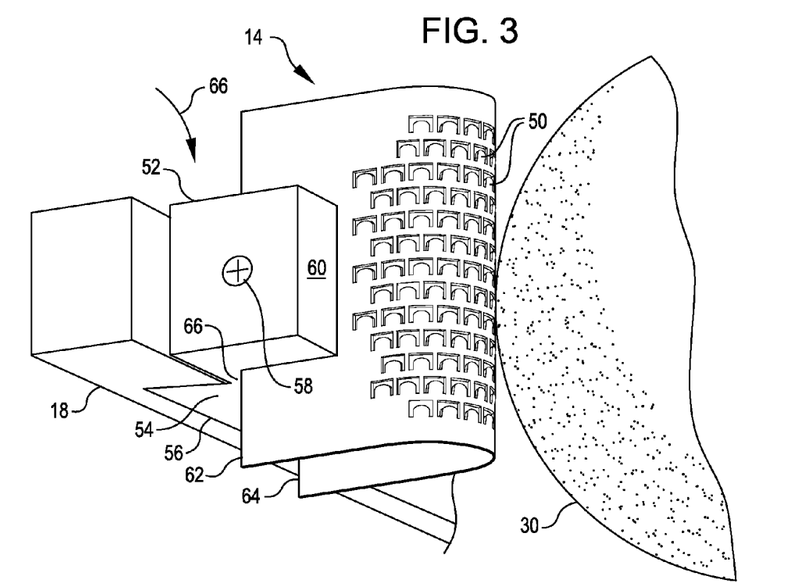
FIG. 3 is a perspective view of a blade of the device shown in FIG. 1, contacting the flavedo of a citrus fruit to extract zest, according to an embodiment of the invention.
Figure 4:
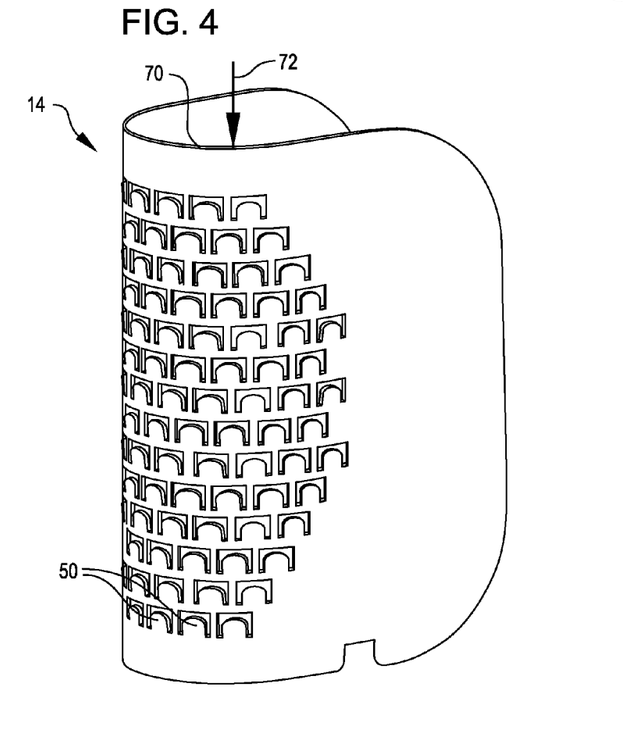
FIG. 4 is a perspective view of a blade of the device shown in FIG. 1, according to an embodiment of the invention.
Figure 5:
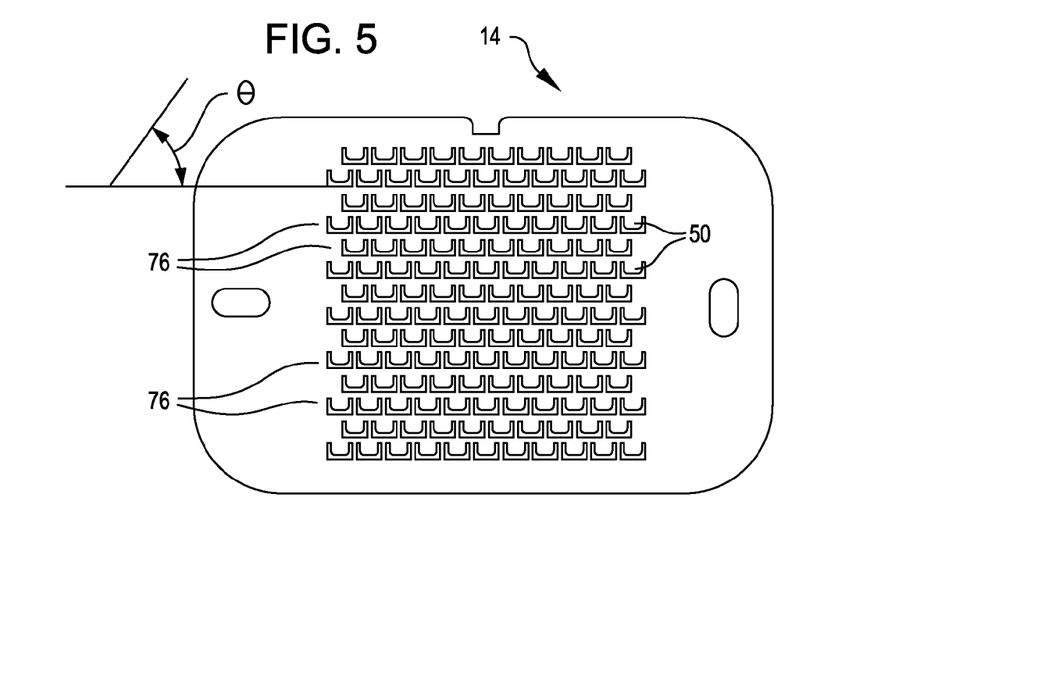
FIG. 5 is plan view of the blade shown in FIG. 4, before being formed into a curved shape.
Figure 6:
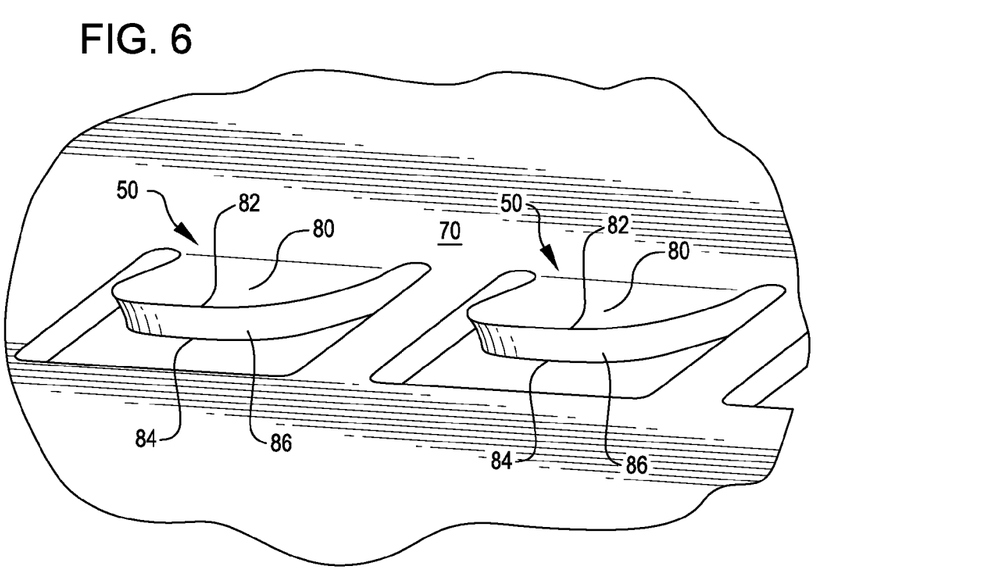
FIG. 6 is a perspective view of a portion of the blade shown in FIGS. 4 and 5, according to an embodiment of the invention.

FIG. 3 is a perspective view of the blade 14 shown in FIG. 1, contacting the flavedo of an orange 30 to extract zest, according to an embodiment of the invention. FIG. 4 is a perspective view of the blade 14 shown in FIG. 1, according to an embodiment of the invention. FIG. 5 is plan view of the blade 14 shown in FIG. 4, before being formed into a curved shaped. And, FIG. 6 is a perspective view of two teeth 50 of the blade 14 shown in FIGS. 4 and 5, according to an embodiment of the invention.

Referring to FIG. 3, the blade 14 may be releasably mounted to the arm 18 in any desired manner. For example, in this and other embodiments, a connector 52 holds the blade 14, and includes a boss 54 that is configured to slide into the groove 56 of the arm 18. The blade 14 is attached to the connector 52 by a screw 58 that is threaded through a wall 60 of the connector 52 and into a hole (not shown) in the blade 14. With the screw 58 inserted into the hole of the blade 14, the screw resists the force that the orange 30 applies to the blade 14 as the orange 30 scrapes across the blade 14. To keep the blade 14 from rotating relative to the screw 58 as the oranges scrapes across the blade 14, the ends 62 and 64 of the blade 14 contact the back wall 66 of the connector 52. The groove 56 of the arm 18 is configured to allow the boss 54 of the connector 52 to enter from above (see arrow 66) but not pass through the groove 56. To remove the boss 54 from the groove 56, and thus the blade 14 from the arm 18, one exerts pressure on the connector 52 or blade 14 in a direction opposite the arrow 66.

Other embodiments are possible. For example, a set screw (not shown) that extends through the end of the arm 18 and contacts the connector 52 when the connector's boss 54 is inserted into arm's groove 56, may be used to frictionally mount the connector 52 to the arm 18. As another example, the blade 14 may be fixed (not releasably held) by the connector 52 using any desired mechanism for this purpose.

Referring to FIG. 4, the blade 14 may be configured as desired to extract flavedo from most of the fruit's peel. For example, in this and other embodiments the blade 14 includes a curved body 70 to ensure that one or more of the teeth 50 (many shown but only two identified with the reference number for clarity) contact the fruit's peel at all times while the fruit moves from the initial position shown in FIG. 2A to the final position shown in FIG. 2C. Here, the curved body 14 is a portion of a cylinder having a radius 72 of 0.325 inches. With the teeth 50 of the blade 14 exposed through 180 degrees of the curve of the body 70, flavedo may be extracted from the top and the bottom of the fruit. The top of the fruit is the portion of the fruit 30 (FIG. 2A) that contacts the blade 14 in FIG. 2A, and the bottom of the fruit is the portion of the fruit 30 that contacts the blade 14 in FIG. 2C.

Other embodiments are possible. For example, the blade 14 may include a curved body 70 that is a portion of a sphere, or that has a parabolic cross-section. In still other embodiments, the blade 14 may include a substantially flat body that is rotatably mounted to a support such that as the orientation of the fruit's surface changes while the fruit moves from the initial position shown in FIG. 2A toward the final position shown in FIG. 2C, the flat body can mimic the change in orientation, and thus keep the teeth of the blade 14 properly engaged with the fruit's flavedo.

Still referring to FIG. 4, the blade 14 may include any desired material capable of holding an edge and withstanding repeated cleanings. For example, in this and other embodiments, the blade 14 includes conventional 303 stainless steel material. In other embodiments, the blade includes conventional 304 stainless steel material, and/or conventional 18-8 stainless steel material.

Referring to FIG. 5, the blade 14 is shown flat before it is formed to include the curved body 70. The teeth 50 (many shown but only two identified with the reference number for clarity) may be arranged in any desired pattern that provides the desired form of the extracted flavedo. For example, in this and other embodiments, the teeth 50 are arranged in rows 76 (14 shown but only 4 identified by the reference number for clarity), each off-set from its adjacent row by an angle θ. Here, the angle θ is about 55°. With this angle the blade 14 extracts the flavedo in a long string. If the angle θ is 45° or less, then the blade 14 extracts the flavedo in small short shavings.

Other embodiments are possible. For example, adjacent rows 76 may be vertically aligned, that is, may have an off-set angle θ of about 90°. This may be desirable when the movement of the fruit relative to the blade 14 includes very little translation 42 (FIGS. 2A-2C).

Referring to FIG. 6, each tooth 50 may be configured as desired to extract flavedo from a fruit while leaving behind the pith of the fruit. For example, in this and other embodiments, each tooth 50 includes a body 80 that extends from the body 70 of the blade 14, and an edge 82 that slices into the flavedo and separates a portion of the flavedo from the pith. The body 80 of the tooth 50 extends from the body 70 of the blade 14 at an angle of about 14° and for a length that locates the edge 82 about 0.012 inches above the body 70. The edge 82 extends in an arc around the periphery of the tooth 50 and is formed by chemically etching the underside 84 of the tooth 50 to generate an undercut 86. Furthermore, the width of each tooth 50 is equal to or substantially equal to 0.083 inches, which is the length of the translation 42 for each complete rotation 40 of the carrier 16 (FIGS. 2A-2C). With these two lengths being equal or substantially equal to each other, the blade 14 extracts the flavedo as a long string.

Other embodiments are possible. For example, the blade 14 may include a plurality of teeth 50 that are not all similarly configured. In still other embodiments, the angle that the tooth's body 80 extends from the blade's body 70 may be more or less than 14° to accommodate fruits having a harder or softer flavedo, respectively. In still other embodiments, the edge 82 may be located closer to or farther away from the blade's body 70 to accommodate fruits having a thinner or thicker flavedo, respectively. In still other embodiments, the width of each tooth 50 may be more or less than the length of the translation 42 for each complete rotation 40 of the carrier 16 to extract the flavedo in a form other than a long string.

Figure 7:
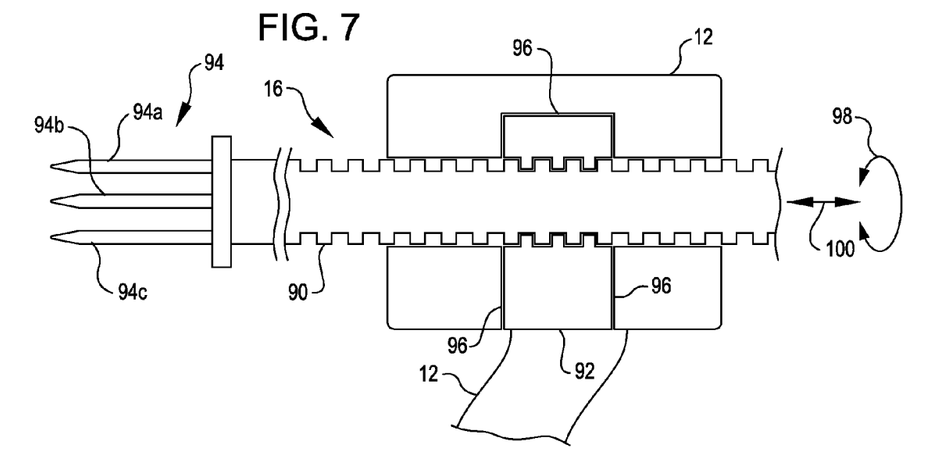
FIG. 7 is a partial, cross-sectional view of a carrier of the device shown in FIG. 1, according to an embodiment of the invention.

FIG. 7 is a partial, cross-sectional view of the carrier 16 of the device 10 shown in FIG. 1, according to an embodiment of the invention. The carrier 16 holds and moves the fruit across the blade 14 (FIGS. 1-6) while the blade 14 separates the flavedo from the fruit's peel.

In this and other embodiments, the carrier 16 includes a threaded body 90 that threadingly engages a nut 92, and a holder 94 that holds the fruit 30 (FIGS. 2A-2C). The nut 92 is nested into a cavity 96 of the body 12 that is configured to receive the nut 92 but not permit the nut 92 to rotate relative to the body 12 in the direction shown by the arrow 98 when the carrier is rotated in the same direction. Thus, when one cranks the handle 22 (FIGS. 1 and 2A-2C), the carrier 16 rotates in the direction shown by the arrow 98 and translates in the direction shown by the arrow 100 to move the fruit relative to the blade 14. The holder 94 includes three spikes 94a, 94b and 94c, that when inserted into the fruit 90 force the fruit to rotate and translate as the carrier 16 rotates and translates. In other embodiments the holder may include two spikes 94a and 94c, or a single spike 94b that has a flat portion that when inserted into a fruit prevents the fruit from rotating relative to the spike.

The threaded body 90 of the carrier may include any desired thread that provides a desired translation distance for each complete rotation that the carrier 16 experiences. For example, in this and other embodiments, the threaded body 90 includes ACME threads sized to provide 12 threads per inch. In other embodiments, the threaded body 90 may include fewer or more threads per inch, and/or a different thread form. To allow one to remove the carrier 16 and replace it with another carrier, such as one that has a threaded body 90 whose number of threads per inch is less than 12, the holder 94 may be removed from the threaded body 90, and the threaded body 90 rotated until it no longer extends through the nut 92. The nut 92 may then be removed from the cavity 96, and another nut 92 inserted into the cavity. Then a carrier 16 that can threadingly engage the newly inserted nut 92 may be threaded though the nut 92. In this manner, one can change the length of the carrier's, and thus a fruit's, translation for each complete rotation of the carrier 16.

Still referring to FIG. 7, the threaded body 90, the nut 92 and the holder 94 may include any desired material capable of withstanding the loads exerted on them while extracting flavedo from a fruit, and repeated cleanings. For example, in this and other embodiments, the threaded body 90, the nut 92 and the holder 94, each, includes conventional 303 stainless steel material. In other embodiments, one or more of the threaded body 90, the nut 92 and the holder 94, may include conventional 304 stainless steel material, and/or conventional 18-8 stainless steel material.

Figure 8:
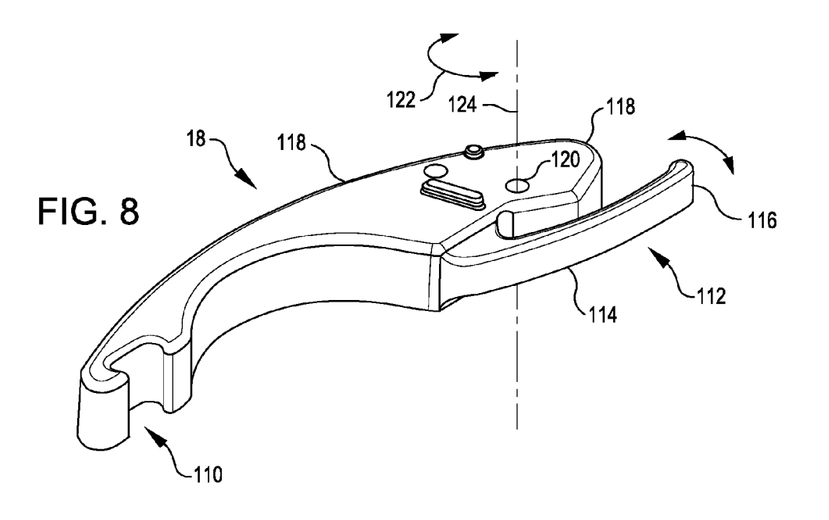
FIG. 8 is a perspective view of an arm of the device shown in FIG. 1, according to an embodiment of the invention.

FIG. 8 is a perspective view of an arm 18 of the device 10 shown in FIG. 1, according to an embodiment of the invention. The arm 18 includes a receiver 110 that receives the connector 52 (FIG. 3) to releasably attach the blade 14 to the arm 18. The arm 18 also includes a spring 112 that, when the arm 18 is mounted to the body 12 (FIG. 1) of the device 10, urges the arm 18, and thus the blade 14, to a position shown in FIGS. 2A and 2C. In this manner, the spring 112 generates contact pressure against the fruit's peel as the fruit pushes the blade 14 away from the carrier 16 while the fruit moves relative to the blade 14. The arm 18 also allows the blade 14 to move toward and away from the carrier 16 to accommodate the contour of the fruit's peel, which is often curved.

In this and other embodiments, the spring 112 includes a cantilevered body 114 that has a distal end 116. When the arm 18 is mounted to the body 12 of the device 10, the spring 112 is deflected toward the arm's body 118 by the head (not shown) of a bolt (not shown) that threadingly engages a nut (not shown) that is trapped by the body 12 similar to the nut 92 in FIG. 7. With the spring deflected, a pin is inserted through two holes (not shown) in a yoke (not shown) of the body 12 and through the hole 120 of the arm's body 118 that is aligned with and lies between the two holes in the yoke. Once pinned in this manner, the arm 18 is allowed to rotate in the direction shown by the arrow 122 about the axis 124; and in response to the cantilevered body's attempt to straighten itself out or relieve the bending stress generated in the body 114, the arm 18 is urged toward the carrier 16 as shown in FIGS. 2A-2C. To adjust the amount of deflection in the cantilevered body 114, and thus the amount of force that the body 114 exerts on the arm's body 118 to urge the arm 18 toward the carrier 16, one may rotate the nut that is trapped by the body 12. By doing this, the head of the bolt may either push the distal end 116 of the arm 18 closer to the body 118 or allow the distal end 116 to move farther away from the body 118. If the bolt head pushes the distal end 116 closer to the body 118, then the force that urges the arm 18 toward the carrier 16 increases, thus generating more contact pressure between the blade 14 and the fruit as the fruit's flavedo is extracted. If the bolt head allows the distal end to move farther away from the arm's body 118, then the force that urges the arm 18 toward the carrier 16 decreases, thus generating less contact pressure between the blade 14 and the fruit as the fruit's flavedo is extracted.

Other embodiments are possible. For example, the spring 112 may be a coiled torsion spring that either pulls on the arm 18 to urge the arm 18, and thus the blade 14, to a position shown in FIGS. 2A and 2C, or pushes on the arm 18 to urge the arm 18, and thus the blade 14, to a position shown in FIGS. 2A and 2C.

The arm 18 may include any desired material capable of withstanding the loads exerted on it during the extraction of a fruit's flavedo, and repeated cleanings. For example, in this and other embodiments, the arm 18 includes conventional food grade plastic material, such as Delrin® or polyoxymethylene.

Figure 9:
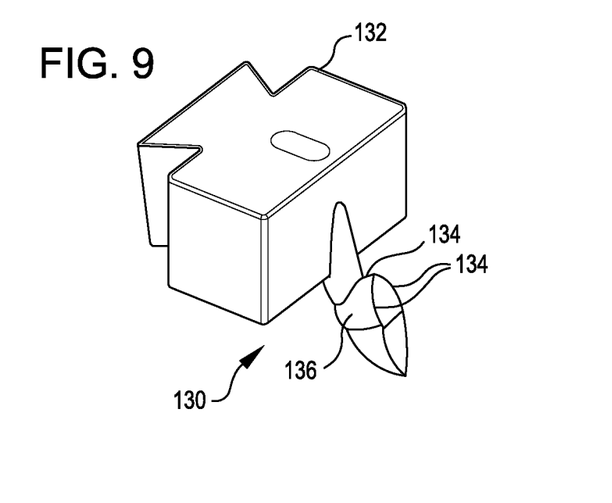
FIG. 9 is a perspective view of another blade that the device shown in FIG. 1 may include, according to another embodiment of the invention.

FIG. 9 is a perspective view of another blade 130 that the device 10 shown in FIG. 1 may include, according to another embodiment of the invention. The blade 130 is typically used to remove a fruit's flavedo (not shown) for use as a garnish. To provide the garnish strength, the flavedo is extracted as a thick, long (typically 4-6 inches) strand that often includes some of the fruit's pith. The blade 130 includes a connector 132, that is similar to the connector 52 in FIG. 3, to releasably attach the blade 130 to the arm 18 (FIGS. 1 and 8). The blade 130 also includes a wedge-shaped edge 134 that penetrates the fruits flavedo and a portion of the fruit's pith. As the carrier 16 moves the fruit relative to the blade 130, the edge 134 cuts the flavedo and pith under the flavedo, and the body 136 of the blade 130 wedges the flavedo away from the fruit. When the desired length for the garnish is reached, one can simply tear the strand from fruit.

Figure 10:
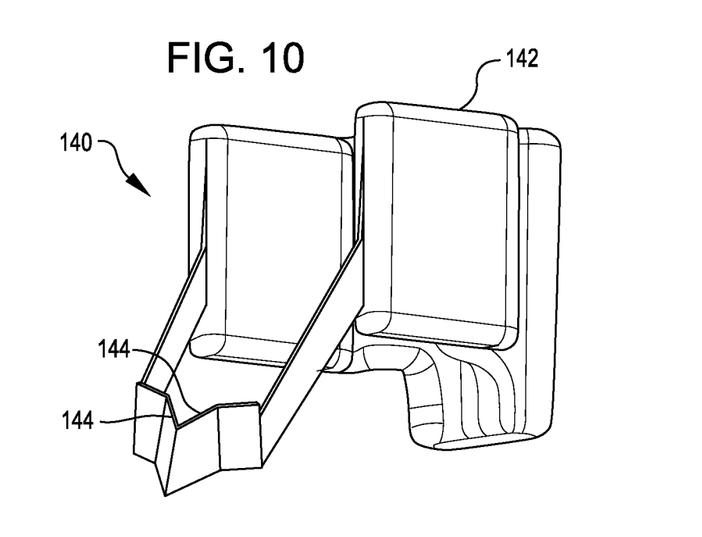
FIG. 10 is a perspective view of yet another blade that the device shown in FIG. 1 may include, according to another embodiment of the invention.

FIG. 10 is a perspective view of yet another blade 140 that the device 10 shown in FIG. 1 may include, according to another embodiment of the invention. The blade 140 is also typically used to remove a fruit's flavedo (not shown) for use as a garnish. The blade 140 includes a connector 142, that is similar to the connector 52 in FIG. 3, to releasably attach the blade 140 to the arm 18 (FIGS. 1 and 8). The blade 140 also includes a V-shaped edge 144 that penetrates the fruits flavedo and a portion of the fruit's pith. As the carrier 16 moves the fruit relative to the blade 140, the edge 144 cuts a V-shaped strand from the fruit's peel that includes a section of the flavedo and a narrower section of the pith under the flavedo. When the desired length for the garnish is reached, one can simply tear the strand from fruit or retract the blade 140 from the fruit's peel.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A device for extracting zest from a fruit, the device comprising:
   a device body;
   an arm body pivotably coupled to the device body, the arm body having a pivot connection point for pivotal connection to the device body, a blade receiving end and an integrated cantilever spring body, said integrated cantilever spring body comprising:
      a proximate end and a distal end, the proximate end being fixedly connected to the arm body at a point forward of the pivot connection point, and the distal end being configured to frictionally engage the device body at a point rearward of the pivot connection point and thereby bias the blade receiving end toward the fruit with a predetermined contact pressure,
   a blade coupled to the receiving end of the arm and being configured to separate a portion of the flavedo from the pith of a fruit's peel while the fruit's peel contacts the blade and moves relative to the blade; and
   a carrier coupled to the device body, that holds and rotates the fruit while the blade separates a portion of the flavedo from the pith of the fruit's peel.

2. The device of claim 1 wherein the blade separates a portion of the fruit's flavedo from the fruit's pith while the fruit moves relative to the blade in a direction that causes a location on the fruit's peel to define a helical path.

3. The device of claim 1 wherein the carrier moves the fruit relative to the blade while the blade separates a portion of the flavedo from the pith of the fruit's peel.

4. The device of claim 1 wherein the carrier is threadingly coupled to the device body and movable relative to the body.

5. Device of claim 1 wherein the carrier is threadingly coupled to the device body and movable relative to the device body such that the motion of the carrier relative to the device body includes rotational motion and translational motion.

6. The device of claim 1 wherein the carrier is releasably coupled to the device body.

7. The device of claim 1:
   wherein the carrier moves the fruit relative to the blade while the blade separates a portion of the flavedo from the pith of the fruit's peel, and
   further comprising a handle coupled to the carrier for rotating the carrier relative to the device body to move the fruit relative to the blade.

8. The device of claim 1 wherein the blade includes a plurality of teeth.

9. The device of claim 1 wherein the blade includes a plurality of teeth, each configured to cut a portion of the fruit's flavedo from the fruit's pith without separating the pith from the berry of the fruit, while the fruit's peel contacts the blade and moves relative to the blade.

10. The device of claim 1 wherein the blade includes a curved body and a plurality of teeth positioned on the curved body such that one or more teeth contact the fruit's peel at all times while the fruit moves relative to the blade.

11. The device of claim 1 wherein the blade separates the portion of the flavedo from the pith as a strip, while the fruit's peel contacts the blade and moves relative to the blade.

12. The device of claim 1 wherein the blade separates the portion of the flavedo from the pith as a plurality of shavings, while the fruit's peel contacts the blade and moves relative to the blade.

13. The device of claim 1, wherein the contact pressure of the blade imparted to the fruit by the cantilever spring mechanism can be adjusted based on the hardness of the flavedo.

14. The device of claim 1, wherein the contact pressure generated by the cantilever spring mechanism is predetermined to be between 2.2 and 4.0 pounds for extraction of a flavedo of a ripe orange.

* * * * *